(12) United States Patent
Abarquez et al.

(10) Patent No.: US 7,448,980 B2
(45) Date of Patent: Nov. 11, 2008

(54) PLANETARY GEAR ASSEMBLY

(75) Inventors: Ronald J. Abarquez, Mauldin, SC (US);
Richard F. Murphy, Torrington, CT (US)

(73) Assignee: Timken US Corporation, Torrington, CT (US)

( * ) Notice: Subject to any disclaimer, the term of this patent is extended or adjusted under 35 U.S.C. 154(b) by 327 days.

(21) Appl. No.: 11/382,167

(22) Filed: May 8, 2006

(65) Prior Publication Data

US 2006/0252596 A1 Nov. 9, 2006

Related U.S. Application Data

(60) Provisional application No. 60/679,174, filed on May 9, 2005.

(51) Int. Cl.
*F16H 57/08* (2006.01)
(52) U.S. Cl. ...................................... 475/348
(58) Field of Classification Search ........................ None
See application file for complete search history.

(56) References Cited

U.S. PATENT DOCUMENTS

| | | | | |
|---|---|---|---|---|
| 3,906,818 A | * | 9/1975 | Benthake et al. | 475/337 |
| 4,392,396 A | * | 7/1983 | Sato et al. | 475/343 |
| 4,988,329 A | * | 1/1991 | Lammers | 475/337 |
| 5,437,209 A | | 8/1995 | Santoro | |
| 5,593,362 A | * | 1/1997 | Mizuta | 475/348 |
| 6,561,945 B2 | | 5/2003 | Shattuck et al. | |
| 7,022,039 B2 | | 4/2006 | Hasegawa et al. | |

* cited by examiner

*Primary Examiner*—Dirk Wright
(74) *Attorney, Agent, or Firm*—Michael Best & Friedrich LLP

(57) ABSTRACT

A planetary gear assembly includes a carrier, a planet shaft, a planet gear, and a plurality of rollers. The planet shaft is coupled to the carrier. The planet gear is rotatable about the planet shaft and the plurality of rollers are between the planet gear and the planet shaft to facilitate rotation of the planet gear about the planet shaft. The planetary gear assembly further includes a sleeve that surrounds the planet shaft such that the plurality of rollers roll on the sleeve.

24 Claims, 5 Drawing Sheets

US 7,448,980 B2

PLANETARY GEAR ASSEMBLY

CROSS-REFERENCE TO RELATED APPLICATIONS

This application claims the benefit of U.S. Provisional Patent Application No. 60/679,174 filed May 9, 2005, the entire contents of which are hereby incorporated by reference.

BACKGROUND

The present invention relates to gear assemblies, and more particularly, to planetary gear assemblies.

Generally, planetary gear assemblies include a sun gear, a ring gear, and planet gears between and engaged with the ring gear and the sun gear. Each of the planet gears are typically coupled to a carrier using a shaft about which the planet gears rotate. In one application, the ring gear can be held fixed while the sun gear can be driven by a shaft to cause the planet gears to rotate about their respective shaft and about the sun gear. In such an arrangement, the carrier can be used as an output of the planetary gear assembly. In other applications, any one of the carrier, sun gear or ring gear can be held fixed and any of these components can be used as the input or output.

One known application of planetary gear assemblies is in transmissions, particularly automatic transmissions for a vehicle.

SUMMARY

In one embodiment, the invention provides a planetary gear assembly that includes a carrier, a planet shaft, a planet gear, and a plurality of rollers. The planet shaft is coupled to carrier. The planet gear is rotatable about the planet shaft and the plurality of rollers are between the planet gear and the planet shaft to facilitate rotation of the planet gear about the planet shaft. The planetary gear assembly further includes a sleeve that surrounds the planet shaft such that the plurality of rollers roll on the sleeve.

In another embodiment, the present invention provides a planetary gear assembly that includes a sleeve that surrounds the planet shaft such that the rollers roll on the sleeve and the sleeve rotates with respect to the planet shaft.

In another embodiment, the invention provides a method of assembling a planetary gear assembly. The method includes inserting a plurality of rollers into a bore of a planet gear, and inserting a sleeve having a sleeve bore into the bore of the planet gear. The method further includes inserting a planet shaft into the sleeve bore to couple the planet gear and the plurality of rollers to a carrier.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
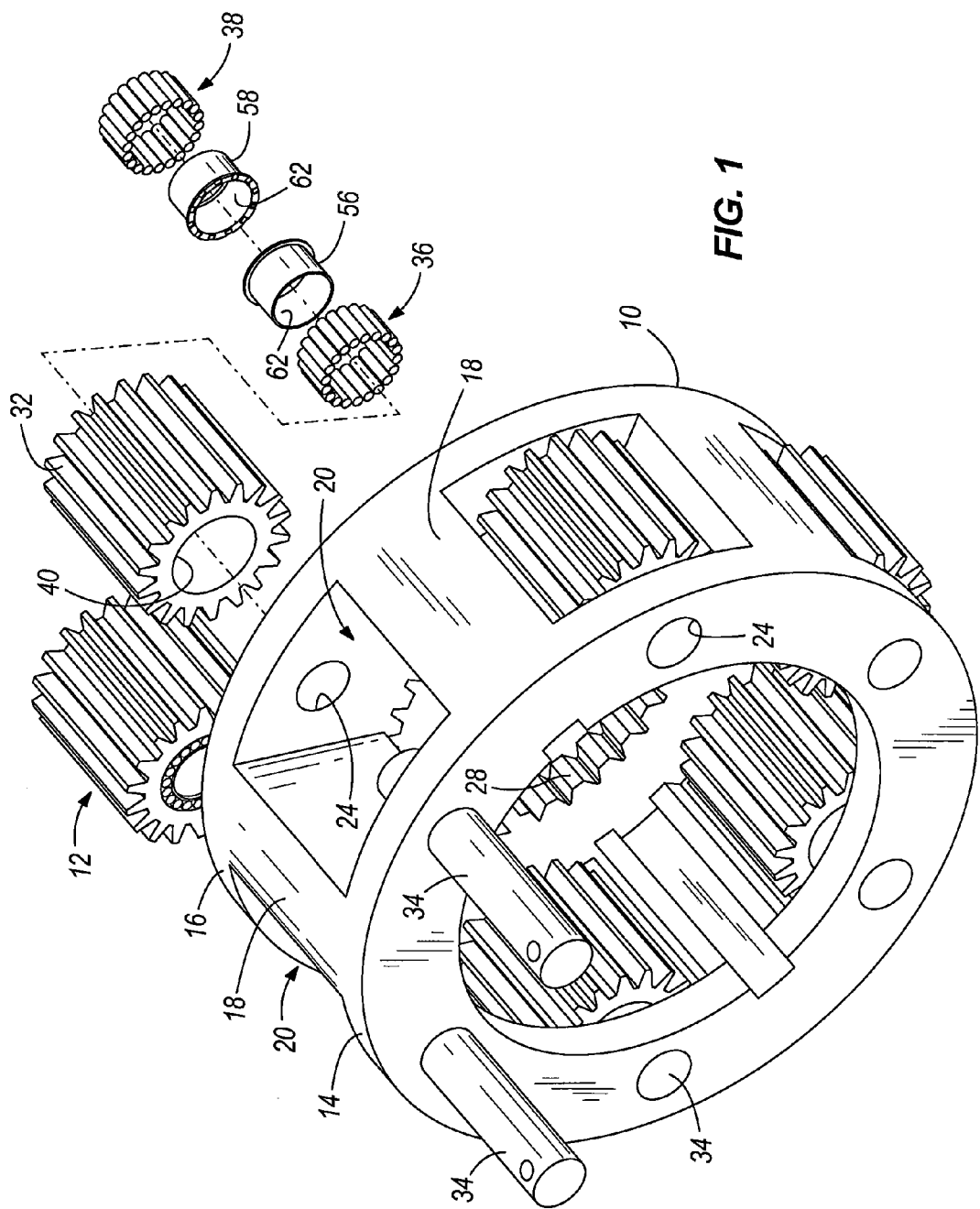
FIG. 1 is an exploded view of a portion of a planetary gear assembly embodying the present invention.
Figure 2:
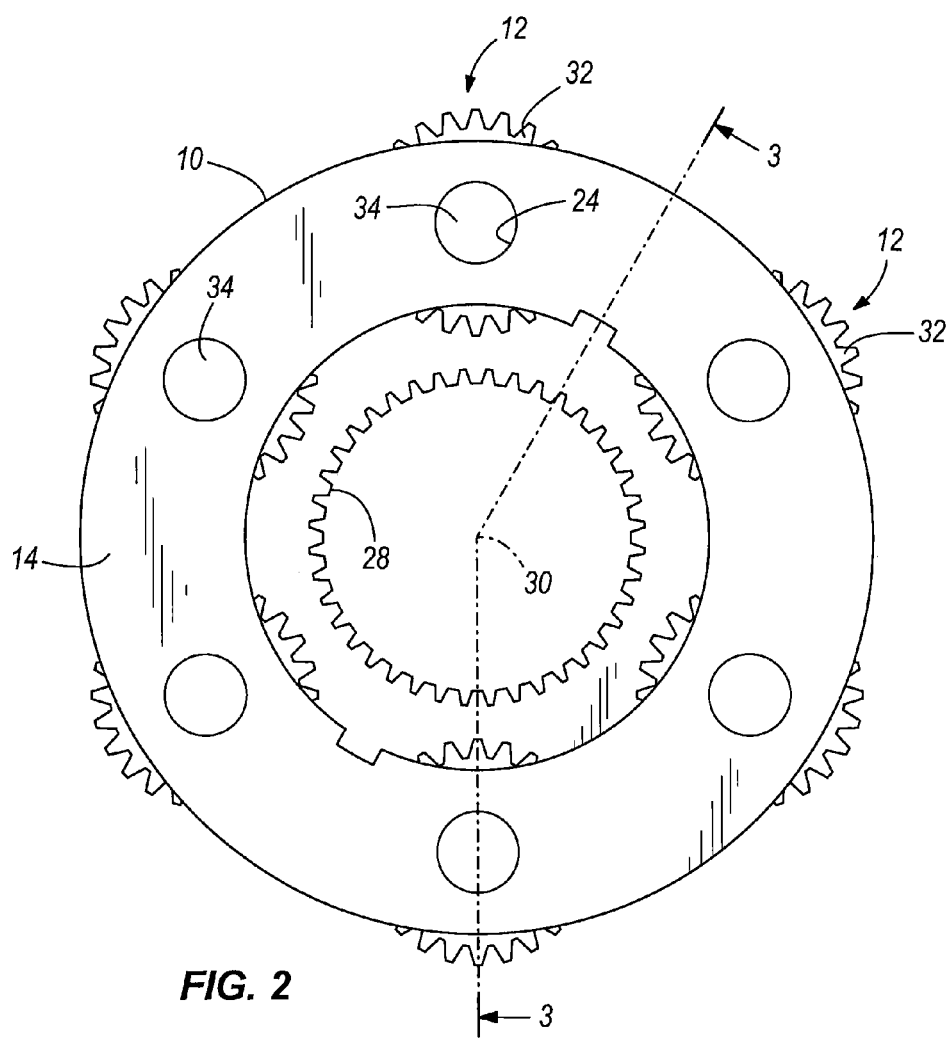
FIG. 2 is a side view of the portion of the planetary gear assembly of FIG. 1.

FIG. 1 illustrates a portion of a planetary gear assembly. The planetary gear assembly includes a carrier 10 that supports a plurality of planet gear subassemblies 12. While only the carrier 10 and the planet gear subassemblies 12 are illustrated in FIG. 1, as is understood by one of skill in the art, the planetary gear assembly would typically further include a sun gear and a ring gear.

The illustrated carrier 10 includes a first end plate 14 and a second end plate 16 that are separated by spacers 18. The spacers 18 and the end plates 14, 16 define windows or pockets 20. In the illustrated construction, a plurality of planet shaft apertures 24 extend through the end plates 14, 16. A pair of planet shaft apertures 24 (one in each end plate 14, 16) is generally centered with respect to each pocket 20 to receive a respective planet shaft 34, as will be described further below.

In the illustrated construction the carrier 10 is integrally formed by casting. In other constructions, the end plates 14, 16 can be formed separately and then coupled together with spacers therebetween. In such constructions, the end plates can be coupled by riveting, welding, bonding, and the like, and the end plates 14, 16 can be formed by stamping, forging, molding, cutting, casting, etc. In yet other constructions, the end plates can be formed by laminating, such as the laminated carrier described in U.S. Pat. No. 6,561,945, the entire contents of which are hereby incorporated by reference.

Figure 3:
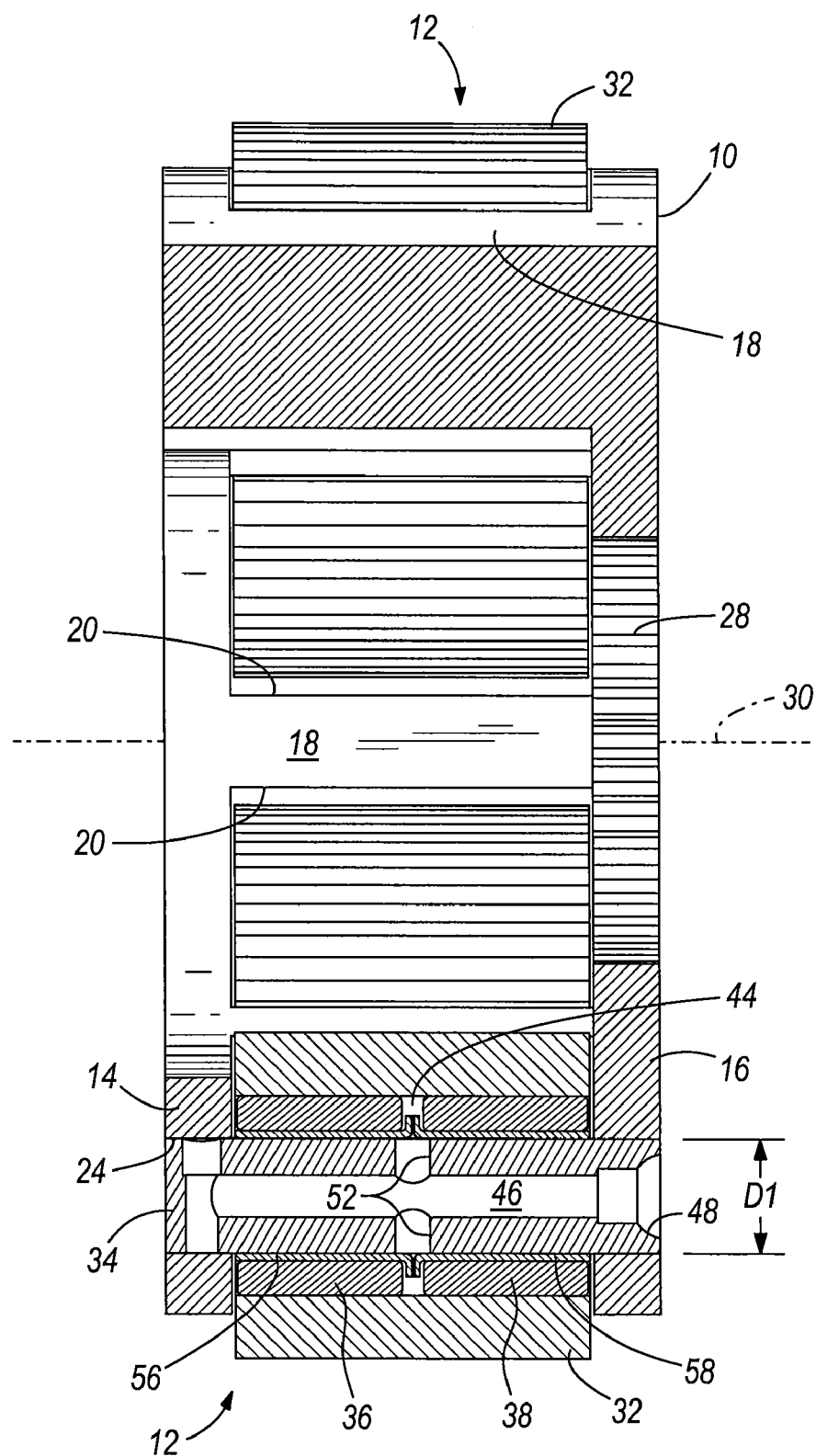
FIG. 3 is a cross-sectional view of the portion of the planetary gear assembly of FIG. 1 taken along line 3-3 of FIG. 2.

Referring to FIGS. 1 and 3, the carrier 10 further includes a splined portion 28 and defines a central axis 30 that extends through the center of the splined portion 28. The splined portion 28 can be used to couple the carrier 10 to a shaft or other suitable member. In other constructions, the carrier may omit the splined portion 28 and can be connected to a shaft, sleeve, or the like in other suitable manners.

It should be understood that FIG. 1 illustrates just one possible carrier 10 and in other constructions, the carrier can take other suitable shapes and forms. For example, while the illustrated carrier 10 includes the first and second end plates 14, 16, in other constructions the carrier may include only a single plate or arms that interconnect the planet gear subassemblies 12.

Referring to FIG. 1, each of the planet gear subassemblies 12 are generally the same. Therefore only one of the planet gear subassemblies 12 will be discussed in detail below. Furthermore, while the illustrated construction of the planetary gear assembly includes six planet gear subassemblies 12, in other constructions, the planetary gear assembly can include more or less than six planet gear subassemblies 12.

The illustrated planet gear subassembly 12 includes a planet gear 32, a planet shaft 34, and first and second sets of rollers 36, 38, respectively, that are located between the planet gear 32 and the planet shaft 34 to facilitate rotation of the planet gear 32 about the planet shaft 34. The planet gear 32 includes a bore 40, and while the illustrated planet gear 32 is a spur gear, in other constructions, the planet gear can be any suitable type of gear, such as a helical gear and the like.

Figure 4:
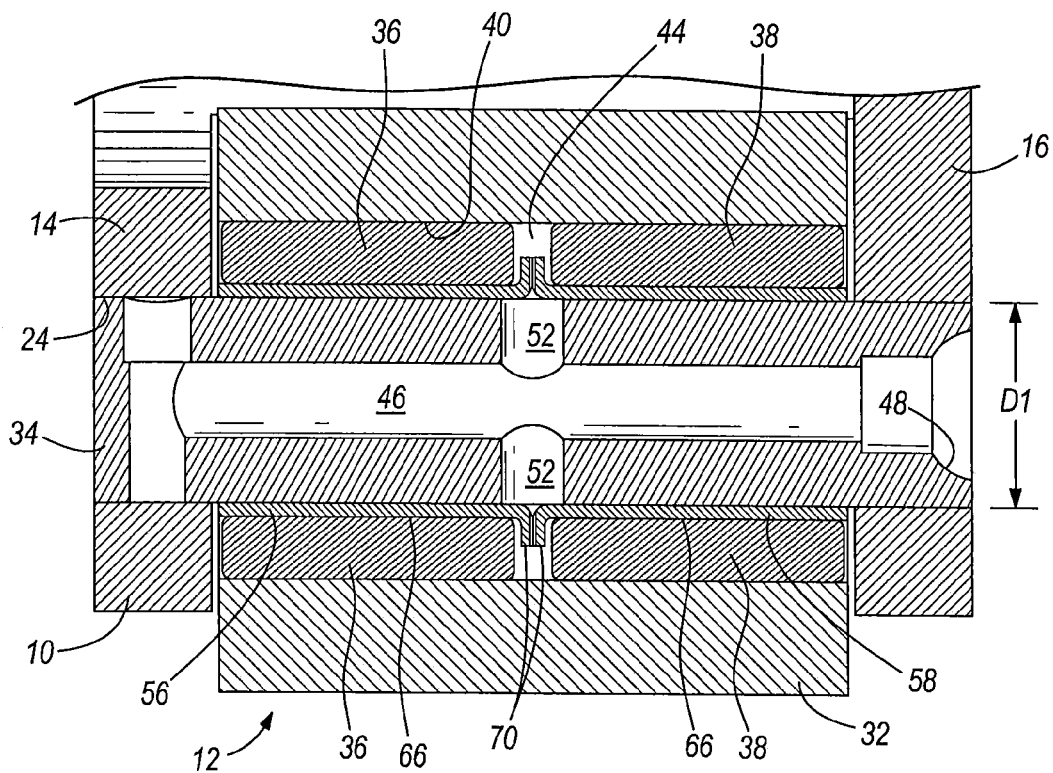
FIG. 4 is an enlarged view of a portion of FIG. 3.

Referring to FIGS. 3 and 4, the planet shaft 34 is a generally cylindrical member having an outer diameter D1. The planet shaft 34 extends through the planet shaft apertures 24 such that the shaft 34 is coupled to the end plates 14, 16. The planet shaft 34 and the planet gear 32 define an annulus 44 therebetween. The planet shaft 34 includes a lubrication passageway 46 formed therein. The illustrated passageway 46 includes an inlet 48 at one end of the planet shaft 34 and one or more outlets 52 that open into the annulus 44 such that the passageway 44 provides fluid communication between the annulus 44 and outer surfaces of the end plates 14, 16.

Referring to FIGS. 1 and 4, the first and second sets of rollers 36, 38 are located within the annulus 44. The first and second sets of rollers 36, 38 are generally the same, and while the illustrated planet gear subassembly 12 includes two sets of rollers 36 and 38 (i.e., a two path bearing), in other constructions, the planet gear subassembly may only include one set of rollers (i.e., a single path bearing). In yet other constructions, the planet gear subassembly 12 can include any suitable number of roller sets.

The sets of rollers 36, 38 can include any suitable rolling element, such as needle rollers, cylindrical rollers, tapered rollers, and the like. Furthermore, while the illustrated sets of rollers 36, 38 provide full complement bearings, in other constructions, the sets of rollers may utilize a cage or other suitable device to separate the rollers.

With continued reference to FIGS. 1 and 4, the planet gear subassembly 12 further includes a first sleeve 56 and a second sleeve 58 that correspond generally to the first set of rollers 36 and the second set of rollers 38, respectively. The first and second sleeves 56, 58 surround the planet shaft 34 such that the first and second sets of rollers 36, 38 roll on the first and second sleeves 56, 58, respectively. In the illustrated embodiment, both the first and second sleeves 56, 58 are generally the same. Therefore, only the first sleeve 56 will be described in detail below.

Figure 5:
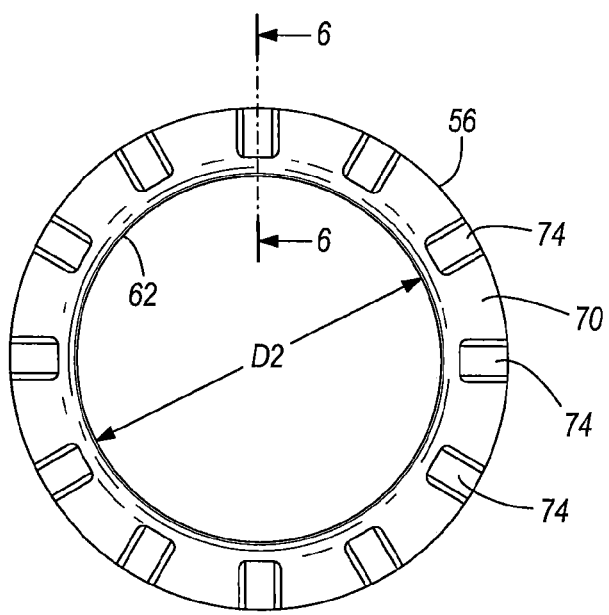
FIG. 5 is an end view of a sleeve of the planetary gear assembly of FIG. 1.

Referring to FIG. 5, the sleeve 56 includes a bore 62 having a bore diameter D2. In one construction, the bore diameter D2 is greater than or equal to the outer diameter D1 of the planet shaft 34. With the bore diameter D2 of the sleeve 56 greater than or equal to the outer diameter D1 of the planet shaft 34, the sleeve 56 is a loose fit with the shaft 34, and the sleeve 56 is able to rotate or precess about the planet shaft 34, as will be discussed further below.

Figure 6:
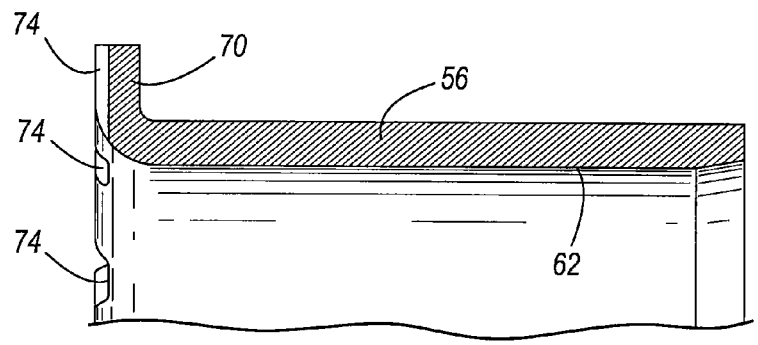
FIG. 6 is a cross-sectional view of the sleeve taken along line 6-6 of FIG. 5.

Referring to FIGS. 4 and 6, the sleeve 56 defines a roller path 66 that provides an inner raceway for the set of rollers 36. The sleeve 56 further includes a flange 70 that extends generally normal to the roller path 36. In the illustrated embodiment, the flange 70 is at one end of the sleeve 56.

Referring to FIGS. 5 and 6, a plurality of apertures 74 are formed in the flange 70 of the sleeve 56. In the illustrated construction, the apertures 74 are a castellation, scallops, or recesses formed in an end of the flange 70. In other constructions, the apertures can be holes formed through the sleeve 56, such as apertures that extend from the bore 62 to the roller path 66.

In one construction, the first and second sleeves 56, 58 can be formed by drawing, and then the sleeves 56, 58 can be through-hardened. The through-hardening facilitates supporting loads from the sets of rollers 36, 38. In other constructions, the sleeves 56, 58 can be formed using any suitable method, such as stamping and rolling, forging, machining, and the like. Such forming methods can be followed by optional heat treatment.

Referring to FIG. 1, to assemble the planet gear subassembly 12 with the carrier 10, the first and second sleeves 56, 58 are inserted into the bore 40 of the planet gear 32 such that the flanges 70 of the sleeves 56, 58 are adjacent one another (see also FIG. 4). Then, from respective ends of the bore 40 the first and second sets for rollers 36, 38 are inserted into the bore 40, between the sleeves 56, 58 and the planet gear 32. Because the illustrated sets of rollers 36, 38 are a full compliment they do not include a cage or retainer. Therefore, it can be advantageous to insert the sets of rollers 36, 38 after the sleeves 56, 58 have been inserted into the bore 40 of the planet gear 32 to help hold the rollers 36, 38 in place prior to insertion of the planet shaft 34. However, in other methods of assembly, such as when the sleeves omit the flanges 70 (discussed below), the sets of rollers 36, 38 can be inserted into the bore 40 of the planet gear 32 before the sleeves 56, 58 are inserted into the bore 40 of the planet gear 32. Such an order of assembly may also be used with sets of rollers that include a cage or retainer.

With continued reference to FIG. 1, the assembled planet gear 32, sets of rollers 36, 38, and sleeves 56, 58 form a subassembly that is inserted into one of the pockets 20. Then, the bores 62 of the sleeves 56, 58 are aligned with the planet shaft apertures 24 of the end plates 14, 16. The planet shaft 34 is inserted through the planet shaft apertures 24 and the bores 62 of the sleeves 56, 58 to couple the subassembly 12 to the carrier 10. The planet shaft 34 can then be fixed to the carrier 10 using clips, pins, adhesives, welding, and the like. In other constructions, the fit between the planet shaft 34 and the planet shaft apertures 24 can be a tight fit, such that the shaft 34 is generally retained within the shaft apertures 24 upon insertion.

Referring to FIGS. 3 and 4, in one mode of operation, the sun gear, the ring gear, or a shaft using the splined portion 28 rotates the carrier 10 about the axis 30 and the planet gears 32 about their respective shafts 34. The sets of rollers 36, 38 facilitate rotation of the planet gears 32 about their respective shaft 34. The sets of rollers 36, 38 roll on the roller path 66 defined by the sleeves 56, 58, and the flange 70 provides a guide and axial stop for ends of the rollers 36, 38.

As the planet gears 32 and sets of rollers 36, 38 rotate about their respective shafts 34, the sleeves 56, 58 also rotate or precess about the shaft 34. Because the bore diameter D2 of the sleeves 56, 58 is equal to or greater than the shaft diameter D1 (i.e., a loose fit), the sleeves 56, 58 are allowed to precess or rotate about the shaft 34. Typically, in one application of the planetary gear assembly, the planetary gear assembly is generally being loaded from the same direction, such as by a shaft coupled to the carrier 10 using the splined portion 28. Such a load transfers to the planet gears 32, then to the sets of rollers 36, 38, and further to the sleeves 56, 58 and the shafts 34.

The precessing or rotation of the sleeves 56, 58 continually changes the portion or zone of the sleeve 56, 58 that is loaded. If the sleeves 56, 58 were unable to rotate or if the sets of rollers 36, 38 rolled directly on the planet shaft 34, the same portion or zone of the sleeve or shaft would always support the load. Such a configuration can lead to premature wear of the sleeve or shaft by fretting, corrosion, cracking, and the like. Allowing the sleeves 56, 58 to rotate or precess on the shaft 34 exposes the entire circumference of the roller path 66 of the sleeves 56, 58 to the loads over time. Therefore, the life (e.g., wear life, fatigue life) of the planetary gear assembly should be extended. Furthermore, because the rollers 36, 38 roll on the sleeves 56, 58, and not on the shaft 34, the outer surface of the shaft 34 need not be bearing quality, meaning that less expensive materials and manufacturing processes can be used for the shaft 34. In addition, the outer diameter D1 of the shaft 34 can be sized to accommodate the sleeves 56, 58, such that the total outer diameter of the shaft 34 and the sleeves 56, 58 is the same as a shaft for a planet gear subassembly that does not include the sleeves 56, 58. Therefore, standard gears and standard sets of rollers, with standard bore diameters, can be uses in the planet gear subassembly 12.

Typically the planetary gear assembly is placed in a bath of lubricant. As the carrier 10 and other components rotate in the bath, the lubricant is flung, sprayed, etc., and enters the passageway 46 of the shaft 34 through the inlet 48.

Referring to FIGS. 4 and 5, the lubricant travels through the passageway 46 and exits through the outlets 52 into the annulus 44 between the planet shaft 34 and the planet gear 32. The apertures 74 formed in the flanges 70 of the sleeve 56, 58 facilitate flow of the lubricant between the flanges 70 in order to lubricate the sets of rollers 36, 38. It should be understood that the lubricant can be any suitable lubricant, such as oil and the like.

Figure 7:
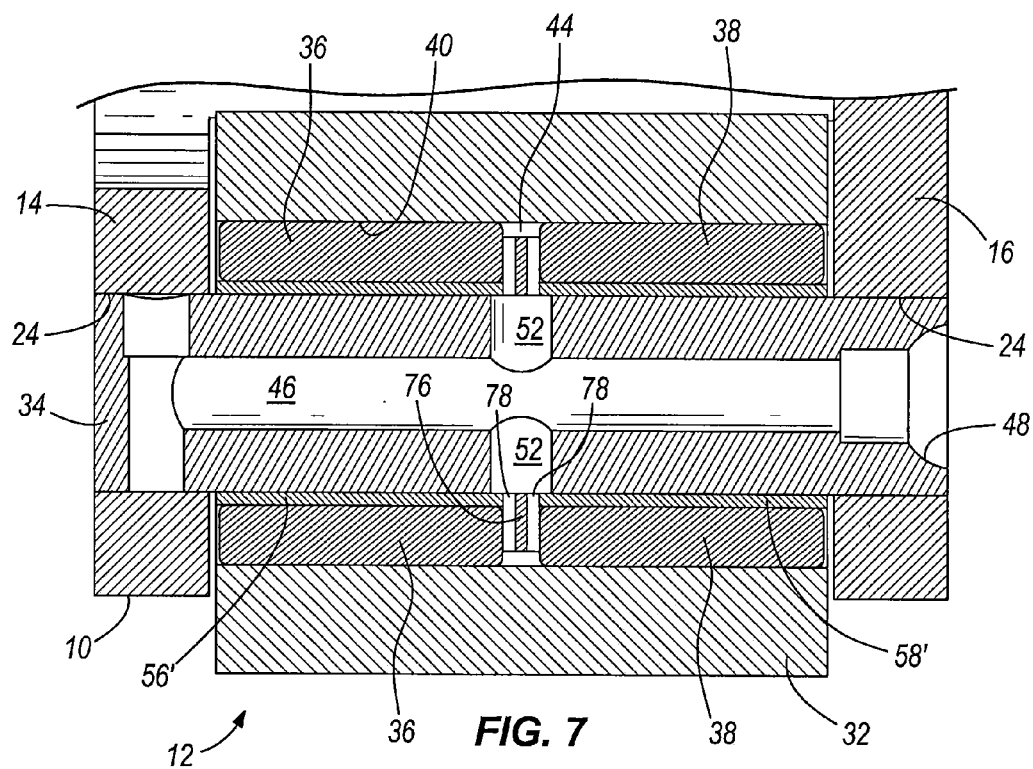
FIG. 7 is an alternative construction of the sleeve of FIG. 1.

FIG. 7 illustrates an alternative construction of the sleeves 56, 58 of FIGS. 1-6. The planetary gear assembly of FIG. 7 is generally the same as the planetary gear assembly of FIGS. 1-6. Therefore, only the general differences will be discussed below and like components have been giving like reference numbers.

In the embodiment illustrated in FIG. 7, the sleeves 56', 58' omit the flange 70 of the sleeves 56, 58 of FIGS. 1-6. In the embodiment illustrated in FIG. 7, the planet gear subassembly 12 further includes a spacer member 76 between the sleeves 56', 58'. The spacer member 76 surrounds the shaft 34, and the spacer member 76 includes apertures 78 that function similarly to the apertures 74 in the flange 70 of the sleeves 56', 58' of FIGS. 1-6 to facilitate the flow of lubricant into the annulus 44. While the apertures 78 are illustrated as recesses formed at the ends of the spacer member 76, in other constructions, the apertures can be castellations, scallops, and the like. In yet other embodiments, the spacer member 76 can be eliminated and the adjacent ends of the sleeves 56', 58' can include recesses, castellations, or other geometry suited for providing a lubricant pathway between the sleeves 56', 58' to the annulus 44.

The assembly and operation of the planet gear subassembly 12 and carrier 10 of FIG. 7 is generally the same as the assembly and operation of the planet gear subassembly 12 and carrier 10 of FIGS. 1-6. Similar to the flange 70 of the sleeves 56, 58 of FIGS. 1-6, the spacer member 76 provides a guide and axial stop for ends of the rollers 36, 38.

Various features and advantages of the invention are set forth in the following claims.

What is claimed is:

1. A planetary gear assembly comprising:
   a carrier;
   a planet shaft coupled to the carrier;
   a planet gear rotatable about the planet shaft;
   a plurality of rollers between the planet gear and the planet shaft to facilitate rotation of the planet gear about the planet shaft; and
   a sleeve that surrounds the planet shaft such that the plurality of rollers roll on the sleeve;
   wherein the sleeve is rotatable about the planet shaft.

2. The planetary gear assembly of claim 1, wherein the sleeve includes a sleeve bore having a diameter, and wherein the diameter of the sleeve bore is greater than or equal to an outer diameter of the planet shaft.

3. The planetary gear assembly of claim 1, wherein the sleeve defines a roller path on which the plurality of rollers roll and includes a flange that extends generally normal to the roller path.

4. The planetary gear assembly of claim 3, wherein the sleeve includes at least one aperture formed in the flange.

5. The planetary gear assembly of claim 3, wherein the sleeve is a first sleeve, the planetary gear assembly further comprising a second sleeve that surrounds the planet shaft the second sleeve including a flange adjacent the flange of the first sleeve.

6. The planetary gear assembly of claim 1, wherein the shaft includes a passageway formed therein to facilitate fluid communication of a lubricant between an exterior surface of the carrier and an annulus between the planet shaft and the planet gear, and wherein the sleeve includes at least one aperture to facilitate fluid communication of the lubricant between the passageway and the annulus.

7. The planetary gear assembly of claim 1, wherein the sleeve provides an inner raceway for the plurality of rollers and the planet gear provides an outer raceway for the plurality of rollers.

8. The planetary gear assembly of claim 1, wherein the sleeve is a first sleeve and the plurality of rollers is a first set of rollers, the planetary gear assembly further comprising,
   a second set of rollers between the planet gear and the planet shaft to facilitate rotation of the planet gear about the planet shaft; and
   a second sleeve that surrounds the planet shaft, adjacent the first sleeve, such that the second set of rollers roll on the second sleeve.

9. The planetary gear assembly of claim 8, further comprising a spacer member that surrounds the shaft between the first sleeve and the second sleeve.

10. The planetary gear assembly of claim 9, wherein the spacer member includes at least one aperture that extends therethrough.

11. A planetary gear assembly comprising:
    a carrier;
    a planet shaft coupled to the carrier;
    a planet gear rotatable about the planet shaft;
    a plurality of rollers between the planet gear and the planet shaft to facilitate rotation of the planet gear about the planet shaft; and
    a sleeve that surrounds the planet shaft such that the rollers roll on the sleeve and the sleeve rotates with respect to the planet shaft.

12. The planetary gear assembly of claim 11, wherein the sleeve includes a sleeve bore having a diameter, and wherein the diameter of the sleeve bore is greater than or equal to an outer diameter of the planet shaft.

13. The planetary gear assembly of claim 11, wherein the sleeve is a first sleeve and the plurality of rollers is a first set of rollers, the planetary gear assembly further comprising,
    a second set of rollers between the planet gear and the planet shaft to facilitate rotation of the planet gear about the planet shaft; and
    a second sleeve that surrounds the planet shaft, adjacent the first sleeve, such that the second set of rollers roll on the second sleeve.

14. The planetary gear assembly of claim 13, wherein the first and second sleeves each define a roller path and include a flange that extends generally normal to the roller path, and wherein the first and second sleeves surround the planet shaft such that the flanges of the first and second sleeves are adjacent each other.

15. The planetary gear assembly of claim 14, wherein each of the first and second sleeves includes at least one recess formed in the respective flange.

16. The planetary gear assembly of claim 13, further comprising a spacer member that surrounds the shaft between the first sleeve and the second sleeve, and wherein the spacer member includes at least one aperture that extends therethrough.

17. The planetary gear assembly of claim 11, wherein the planet shaft includes a passageway formed therein to facilitate fluid communication of a lubricant between an exterior surface of the carrier and an annulus between the planet shaft and the planet gear, and wherein the sleeve defines a roller path on which the plurality of rollers roll and an aperture to facilitate fluid communication of the lubricant between the passageway and the annulus.

18. A method of assembling a planetary gear assembly, the method comprising:
inserting a plurality of rollers into a bore of a planet gear;
inserting a sleeve having a sleeve bore into the bore of the planet gear; and
inserting a planet shaft into the sleeve bore so that the sleeve is rotatable with respect to the planet shaft to couple the planet gear and the plurality of rollers to a carrier.

19. The method of assembling a planetary gear assembly of claim 18, wherein inserting the plurality of rollers into the bore of the planet gear and inserting the sleeve into the bore of the planet gear forms a subassembly including the planet gear, the plurality of rollers, and the sleeve, the method further comprising, placing the subassembly between first and second end plates of the carrier prior to inserting the planet shaft into the sleeve bore.

20. A planetary gear assembly comprising:
a carrier;
a planet shaft coupled to the carrier;
a planet gear rotatable about the planet shaft;
a plurality of rollers between the planet gear and the planet shaft to facilitate rotation of the planet gear about the planet shaft; and
a sleeve that surrounds the planet shaft such that the plurality of rollers roll on the sleeve;
wherein the sleeve defines a roller path on which the plurality of rollers roll and includes a flange that extends generally normal to the roller path.

21. The planetary gear assembly of claim 20, wherein the sleeve includes at least one aperture formed in the flange.

22. The planetary gear assembly of claim 20, wherein the sleeve is a first sleeve, the planetary gear assembly further comprising a second sleeve that surrounds the planet shaft the second sleeve including a flange adjacent the flange of the first sleeve.

23. A planetary gear assembly comprising:
a carrier;
a planet shaft coupled to the carrier;
a planet gear rotatable about the planet shaft;
a plurality of rollers between the planet gear and the planet shaft to facilitate rotation of the planet gear about the planet shaft; and
a sleeve that surrounds the planet shaft such that the plurality of rollers roll on the sleeve;
wherein the shaft includes a passageway formed therein to facilitate fluid communication of a lubricant between an exterior surface of the carrier and an annulus between the planet shaft and the planet gear, and wherein the sleeve includes at least one aperture to facilitate fluid communication of the lubricant between the passageway and the annulus.

24. A planetary gear assembly comprising:
a carrier;
a planet shaft coupled to the carrier;
a planet gear rotatable about the planet shaft;
a plurality of rollers between the planet gear and the planet shaft to facilitate rotation of the planet gear about the planet shaft; and
a sleeve that surrounds the planet shaft such that the plurality of rollers roll on the sleeve;
wherein the sleeve is a first sleeve and the plurality of rollers is a first set of rollers, the planetary gear assembly further comprising,
a second set of rollers between the planet gear and the planet shaft to facilitate rotation of the planet gear about the planet shaft;
a second sleeve that surrounds the planet shaft, adjacent the first sleeve, such that the second set of rollers roll on the second sleeve; and
a spacer member that surrounds the shaft between the first sleeve and the second sleeve, the spacer member including at least one aperture that extends therethrough.

* * * * *